United States Patent [19]

Harrington et al.

[11] 3,895,062
[45] July 15, 1975

[54] BIPHENYL DERIVATIVES

[75] Inventors: Joseph Kenneth Harrington, Edina; George G. I. Moore, Birchwood, both of Minn.

[73] Assignee: Minnesota Mining and Manufacturing Company, St. Paul, Minn.

[22] Filed: Apr. 13, 1970

[21] Appl. No.: 28,019

[52] U.S. Cl. .................. 260/556 F; 71/97; 71/103; 260/429.9; 260/439 R; 260/479 R; 424/289; 424/295; 424/311; 424/321
[51] Int. Cl. ......................................... C07c 143/74
[58] Field of Search ..................... 260/556 F, 479 R

[56] References Cited
FOREIGN PATENTS OR APPLICATIONS
856,452  12/1960  United Kingdom

OTHER PUBLICATIONS

C. A. Vol. 66: 37571a (1967), El-Hewehi et al.

*Primary Examiner*—Henry R. Jiles
*Assistant Examiner*—S. D. Winters
*Attorney, Agent, or Firm*—Alexander, Sell, Steldt & DeLaHunt

[57] ABSTRACT

Biphenyls substituted by a lower perfluoroalkylsulfonamido group and optionally containing lower alkyl, lower alkoxy, hydroxy, nitro, amino, halogen, alkanoyloxy, formamido, or phenyl substituents. These compounds and salts thereof are active as herbicidal and antimicrobial agents and are useful as polymer curing agents.

12 Claims, No Drawings

BIPHENYL DERIVATIVES

This invention relates to biphenyls substituted by a lower perfluoroalkylsulfonamido group and optionally containing lower alkyl, lower alkoxy, hydroxy, nitro, amino, halogen, alkanoyloxy, formamido, or phenyl substituents. These compounds and salts thereof are active as herbicidal and antimicrobial agents and are useful as polymer curing agents. Methods for the preparation and use of these compounds are also included.

It is an object of the invention to provide compounds for the control of microbes, e.g., fungi and bacteria (both gram-positive and gram-negative).

It is another object of the invention to provide compounds which modify the growth of plants, i.e., which prevent, alter, destroy or otherwise affect the growth of plants.

It is another object of the invention to provide compounds which act as polymer curing agents.

It is another object of the invention to provide compounds which are anti-inflammatory agents.

It is a further object of the invention to provide a method for controlling micro-organisms.

It is a further object of the invention to provide a method for controlling unwanted plants.

It is a further object of the invention to provide a method for controlling inflammation in mammalian tissue.

It is still another object of the invention to provide anti-microbial compositions containing one or more haloalkylsulfonamido-substituted diphenyls as active ingredients therein.

It is still another object of the invention to provide herbicidal compositions containing one or more haloalkylsulfonamido-substituted diphenyls as active ingredients therein.

It is still another object of the invention to provide anti-inflammatory compositions containing one or more haloalkylsulfonamido-substituted diphenyls as active ingredients therein.

Still other objects will be made apparent by the following specification.

DETAILED DESCRIPTION

According to the present invention, there is provided a class of compounds consisting of substituted diphenyl compounds of the formula

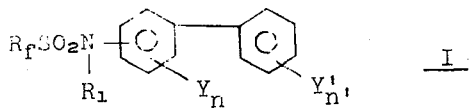   I wherein $R_f$ is a lower perfluoroalkyl group, $R_1$ is hydrogen or a pharmaceutically or agriculturally acceptable cation, and Y and Y' are independently selected from the group consisting of lower alkyl, lower alkoxy, hydroxy, nitro, amino, halogen, lower alkanoyloxy, formamido and phenyl and $n$ and $n'$ are independently zero, one, two or three. When $n$ is zero, the ring adjacent to the perfluoroalkylsulfonamido group is unsubstituted except for that group and the second ring. Similarly, when $n'$ is zero, the second ring is unsubstituted except for the group shown in the formula and attached thereto through the first aromatic ring.

$R_f$ may be straight or branched chain perfluoroalkyl. Most preferred are compounds wherein $R_f$ is trifluoromethyl. The term lower when applied to substituent groups (radicals) of this invention, such as perfluoroalkyl, alkyl, alkoxy and alkanoyloxy refers to groups containing from one to four carbon atoms.

The various Y and Y' groups in the compounds of the invention can be the same or different.

The compounds of the invention are acidic in nature when $R_1$ is hydrogen. Consequently, they form salts i.e. compounds of Formula I wherein $R_1$ is a pharmaceutically or agriculturally acceptable cation. These are generally metal, ammonium and organic amine salts and can be prepared by treating the acid form (compounds of Formula I in which $R_1$ is hydrogen) with a stoichiometrically equivalent amount of an appropriate base under mild conditions. Among the metal salts of the invention are alkali metal (e.g. lithium, sodium and potassium), alkaline earth metal (e.g. barium, calcium and magnesium) and heavy metal (e.g. zinc and iron) salts as well as other metal salts such as aluminum. Appropriate bases for use in preparing the metal salts include metal oxides, hydroxides, carbonates, bicarbonates and alkoxides. Some salts are also prepared by cation exchange reactions (by reacting a salt of the invention with an organic or inorganic salt in a cation exchange reaction). The organic amine salts include the salts of alkylamines and aromatic amines, primary, secondary or tertiary. These and the ammonium salts can be prepared by reacting the acid form with the appropriate organic base or ammonium hydroxide. The pharmaceutically acceptable salts are generally the salts of alkali metals, alkaline earths, ammonia and amines. Preferred among the pharmaceutically acceptable salts are those in which $R_1$ is an amine cation. Any of the salts of the types set out above are agriculturally acceptable, the one chosen depending upon the particular use and upon the economics of the situation.

The salts of the invention are frequently formed by reacting the precursors in aqueous solution. This solution can be evaporated to obtain the salt of the compound, usually as a dry powder. In some cases, it may be more convenient to use a non-aqueous solvent such as alcohols, acetone, etc. The resulting solution is then treated to remove the solvent, for example, by evaporation under reduced pressure. Since many of the salts are water soluble, they are often used in the form of aqueous solutions. Also, they can be used in making pharmaceutical preparations in the form of capsules for oral administration.

To produce the compounds of Formula I wherein $R_1$ is hydrogen, a primary arylamine is condensed with a perfluoroalkanesulfonyl halide or anhydride according to the following equation:

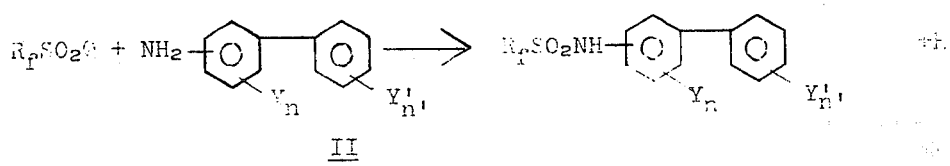

II wherein $R_f$, Y, Y', n and n' are as previously defined and Q is halogen or a perfluoroalkanesulfonate grouping ($R_fSO_2O—$).

Approximately equivalent amounts of the reactants are brought together at temperatures most often ranging between about −15° and 150° C. If necessary or desirable, the reaction can be carried out in a pressure vessel. Preferably, but not necessarily, an acid acceptor e.g., a salt of a weak acid such as the alkali or alkaline earth metal carbonates and bicarbonates or a tertiary amine such as pyridine, triethylamine or N,N-dimethylaniline is utilized. The amount of the acid acceptor can be varied widely; however, a 10 mole percent excess of that amount of base sufficient to bind the liberated strong acid (HQ) is routinely employed.

The condensation is also usually conducted in the presence of an appropriate inert organic solvent. An excess of the aromatic primary amine may also serve as the acid acceptor, but that is not generally a preferred procedure. Among the suitable solvents are 1,2-dimethoxyethane, benzene, toluene, acetonitrile, chloroform, dichloromethane, dimethylacetamide, dimethylformamide and the like. Alternatively an excess of an organic amine acid acceptor may serve as solvent in some instances.

A preferred method for the preparation of compounds of the invention wherein $R_f$ is trifluoromethyl is the reaction of the primary arylamine with trifluoromethane-sulfonic anhydride with triethylamine as the acid acceptor and dichloromethane as solvent.

After reaction is complete, if the reaction solvent is not water miscible, the product mixture can be extracted with a dilute aqueous base solution. The product, in the form of a salt which is usually soluble in the aqueous layer, is precipitated therefrom by careful addition of a mineral acid such as hydrochloric or sulfuric acid, and collected by filtration. Alternatively the product mixture can be washed with aqueous hydrochloric acid, the solvent evaporated in vacuo, and the residue dissolved in a dilute aqueous base solution which is steam distilled to remove organic acid acceptor and treated with decolorizing charcoal. The product in the form of a salt is precipitated with concentrated acid, extracted, e.g., with chloroform or dichloromethane, and reisolated by evaporating the solvent.

If the reaction solvent is water miscible, the product is generally obtained by dilution of the reaction mixture with water. The product, a solid or oil, is separated and purified by conventional methods. The compounds prepared according to the foregoing procedures are solids or liquids purified, in general, by recrystallization from aqueous alcohol, trichloroethylene, hexane, benzene-hexane mixtures and the like or by fractional distillation. Sublimation and elution chromatography have also been found to be useful purification techniques.

Compounds of the invention wherein Y or Y' is lower alkoxy, hydroxy, amino or nitro react using standard synthetic organic chemistry methods to give other compounds of the invention. Compounds of the invention wherein Y and/or Y' are hydroxy are preferably prepared by ether cleavage of compounds of the invention having lower alkoxy groups such as methoxy using standard ether cleavage reagents such as hydrogen iodide in acetic acid. Compounds of the invention wherein Y and/or Y' are amino are preferably prepared by selective reduction of compounds of the invention having nitro groups using standard chemical and catalytic reduction reagents. Compounds of the invention wherein Y or Y' is alkanoyloxy are prepared by acylation of compounds wherein Y or Y' is hydroxy. Compounds of the invention wherein Y or Y' is formamido are prepared by reaction of compounds wherein Y or Y' is amino with formamide by heating.

Some compounds which are exemplary of the invention are:
4-(2,4,6-trimethylphenyl)trifluoromethanesulfonanilide;
3-(2,5-dichlorophenyl)-4-methyltrifluoromethanesulfonanilide;
4-(2-chloro-5-methylphenyl)trifluoromethanesulfonanilide;
2-(2-hydroxyphenyl)trifluoromethanesulfonanilide;
4-hydroxy-3-phenyltrifluoromethanesulfonanilide;
4-(2-aminophenyl)trifluoromethanesulfonanilide;
3-hydroxy-4-phenyltrifluoromethanesulfonanilide;
4-(4-bromophenyl)perfluoroisopropanesulfonanilide;
4-(2-nitrophenyl)perfluoroethanesulfonanilide;
2-(2-methoxyphenyl)trifluoromethanesulfonanilide;
2-(2-biphenylyl)trifluoromethanesulfonanilide;
4-(2-formamidophenyl)trifluoromethanesulfonanilide and
4-acetoxy-3-phenyltrifluoromethanesulfonanilide.

Suitable haloalkylsulfonyl halides and anhydrides for use as starting materials in these procedures are known to the art, for example, those described in U.S. Pat. No. 2,732,398, in the Journal of the Chemical Society (London), 3058 (1960) and elsewhere.

Some suitable primary arylamines for use in the synthetic method of this invention are known in the chemical literature, and those which are not specifically known to the art may be prepared by methods well known to the art. The method of preparation of aromatic primary arylamine intermediates of the invention is reduction of the corresponding nitro compound. Chemical or catalytic reduction may be used, and Raney nickel has been used routinely as the reduction catalyst in the method of this invention.

Many of the nitro compound intermediates of the invention are also known to the art. Such intermediates have been prepared using several general, known methods such as the nitrosoacetylamine reaction described in Organic Reactions, Vol. 2, page 224 ff., the Nilsson reaction described in Acta Chimica Scandanavica, 20, 423 (1966) and the method of Cadogan, Journal of the Chemical Society, 4257 (1962).

As noted previously, the compounds of the invention have several areas of utility. The acid form compounds of the invention are catalysts for certain acid-catalyzed polymerizations. All of the compounds of the invention, including the agriculturally acceptable salts, are useful as herbicides, as determined by standard screening methods against various weed species. Further, the compounds of the invention are broadly active and useful as anti-microbial agents and some are active anti-inflammatory agents, as determined in standard screening tests on test animals.

When the compounds of the invention are used as acidic catalysts or initiators for polymerizations, they are mixed with the monomer or prepolymer. Suitable monomers include epoxide and vinyl ether monomers. The rate of reaction and the degree of polymerization varies depending upon the temperature at which the polymerization is carried out and the reactivity of the monomer, and heating of the polymerization reaction is generally utilized to obtain a faster polymerization rate.

The herbicidal activity of representative compounds of formula I has been determined using screening tests against experimental plantings. Both pre- and post-emergence activity are determined in a direct screen against selected weed species. The following weed mixtures are used for the tests.

Grasses:
  Giant foxtail (*Setaria faberii*)
  Barnyard grass (*Echinochloa crusgalli*)
  Crabgrass (*Digitaria ischaemum*)
  Quackgrass (*Agropyron repens*)
Broadleaves:
  Pigweed (*Amaranthus retroflexus*)
  Purslane (*Portulaca oleracea*)
  Wild Mustard (*Brassica kaber*)
  Wild morning glory (*Convolvulus arvensis*)

The test chemicals are dissolved in a small amount of acetone or other suitable solvent and then diluted with water to give a concentration of 2000 ppm. From this concentration aliquots are diluted to give a final concentration of 500 ppm. Eighty ml. of this solution are added to a 6-inch pot containing the weed seeds to give a concentration equivalent to 20 lb./acre. All subsequent waterings are made from the bottom. Two pots are used per treatment. Data are taken two to three weeks after treatment and recorded as percent pre-emergence kill for each species compared to the untreated controls.

To assess post-emergence activity, the same weed mixtures are allowed to grow from 2 to 3 weeks until the grasses are approximately 1 to 3 inches and the broadleaves 1½ inches tall. They are sprayed for approximately 10 seconds or until good wetting of the leaf surfaces occurs with a 2000 ppm solution as described above.

Data are taken two to three weeks after treatment and recorded as percent kill for each species compared to the untreated controls.

The following compounds of the invention are preferred because of their good herbicidal activity at 20 pounds per acre or 2000 ppm or less:
  4-phenyltrifluoromethanesulfonanilide
  3-phenyltrifluoromethanesulfonanilide
  2-phenyltrifluoromethanesulfonanilide
  4-(4-chlorophenyl)trifluoromethanesulfonanilide
  triethylammonium 3-(4-chlorophenyl)trifluoromethanesulfonanilide Other compounds of formula I are active when applied at greater or smaller rates of application. It will be appreciated that not all of the compounds are equally active.

For application to plants, the compounds can be finely divided and suspended in any of the usual aqueous media. In addition, spreading agents, wetting agents, sticking agents or other adjuvants can be added as desired. Dry powders, as such or diluted with inert materials such as diatomaceous earth, can likewise be used as dusts for this purpose. The preparations are coated on the plants or the ground is covered when pre-emergence control is desired. Application is made with the usual sprayers, dust guns and the like. Application rates are at 10-20 lbs./acre in general, but may be increased or reduced according to individual circumstances of use.

The anti-inflammatory activity can be conveniently demonstrated using assays designed to test the ability of these compounds to antagonize the local edema which is a characteristic of the anti-inflammatory response (rat foot edema test) and to inhibit the onset of the erythematous manifestation of inflammation (guinea pig erythema test).

These are standard assays well-known to those skilled in the art. They are described in journals and other publications. Leading references to the rat foot edema test are:
1. Adamkiewicz et al, Canad. J. Biochem. Physio. 33:332, 1955;
2. Selye, Brit. Med. J. 2:1129, 1949 and
3. Winter, Proc. Soc. Exper. Biol. Med. 111:554, 1962.

Leading references to the guinea pig erythema test are:
1. Wilhelmi, Schweiz. Med. Wschr. 79:577, 1949 and
2. Winder et al, Arch. Int. Pharmacodyn 116:261, 1958.

The anti-inflammatory activity of various compounds of the invention may be detected by other standard assays known to the art such as the cotton pellet granuloma and adjuvant arthritis tests.

The compounds are administered orally, for example as four percent acacia suspensions, but may also be administered parenterally. Amounts are generally about 1 to 500 mg./hg. of body weight of the mammal to be treated.

The anti-microbial activity of the compounds of the invention has been evaluated using a variation of the original agar-plate diffusion method of Vincent and Vincent (e.g., see Vincent, J. G., and Vincent, Helen W., Proc. Soc. Exptl. Biol. Med. 55:162–164, 1944, and Davis, B. D., and Mingioli, E. S., Jour. Bact. 66:129–136, 1953.

The following examples are given for the purpose of further illustrating the procedures of the present invention, but are not intended, in any way, to be limiting on the scope thereof. Thus, while the examples relate generally to perfluoromethanesulfonamides, other perfluorocarbon groups can be substituted in place thereof. Also, although the examples relate for the most part to compounds in the acid form (that is having a hydrogen atom bonded to the sulfonamido nitrogen), and a few to the triethylammonium salt, it is understood that the other salts of the invention are also easily prepared and are likewise contemplated. Such salts, which have a cation bonded to the sulfonamido nitrogen, generally have the utility areas of the corresponding acid-form compounds.

All melting points in the examples are uncorrected.

EXAMPLE 1

4-Amino-4'-chlorobiphenyl (21.0 g., 0.103 mole), triethylamine (10.6 g., 0.105 mole), and dichloromethane (200 ml.) are mixed in a reaction vessel and the mixture is cooled using an ice bath. Trifluoromethanesulfonic anhydride (29.0 g., 0.103 mole) is added dropwise over a thirty-minute period. The reaction is allowed to warm to room temperature and stirred overnight. Hydrochloric acid (10 percent, 150 ml.) is added and the mixture is stirred for one hour. The layers are then separated and the dichloromethane layer is evaporated in vacuo. The residue is taken up in excess 10 percent sodium hydroxide solution. The solution is steam distilled, and then treated with decolorizing charcoal. The solution is then acidified with concentrated hydrochloric acid and the product is extracted into chloroform. The chloroform extracts are dried over magnesium sulfate, then the chloroform is removed in vacuo. The product is recrystallized twice from benzene, then sublimed to give 4-(4-chlorophenyl)trifluoromethanesulfonanilide, m.p. 98°–99.5° C.

|                                                  | % C  | % H | % N |
|--------------------------------------------------|------|-----|-----|
| Anal: Calculated for $C_{13}H_9ClF_3NO_2S$:      | 46.5 | 2.7 | 4.2 |
| Found:                                           | 46.7 | 2.7 | 4.2 |

The compounds of Examples 2–17 are prepared according to the method described in Example 1 using the appropriate precursors.

fate and the solvent is removed in vacuo. The residue, 3-(4-chlorophenyl)trifluoromethanesulfonanilide, is taken up in benzene. Enough diethyl ether is added to effect solution and excess triethylamine is added to the solution. The solution is cooled and the solid product is collected by filtration and recrystallized from isopropanol to give white crystals of triethylammonium 3-(4-chlorophenyl)trifluoromethanesulfonanilide, m.p. 115°–119°C.

|                                                     | % C  | % H | % N |
|-----------------------------------------------------|------|-----|-----|
| Anal: Calculated for $C_{19}H_{24}ClF_3N_2O_2S$:    | 52.2 | 5.5 | 6.4 |
| Found:                                              | 52.6 | 5.5 | 6.2 |

| Example Number | Compound | Boiling Point (in °C./mm.) Melting Point (in °C.) |
|---|---|---|
| 2. | 4-(4-bromophenyl)trifluoromethanesulfonanilide | 117–118 |
| 3. | 2-phenyltrifluoromethanesulfonanilide | 49–51 |
| 4. | 4-phenyltrifluoromethanesulfonanilide | 137–138 |
| 5. | 3-phenyltrifluoromethanesulfonanilide | 105–110/0.10 |
| 6. | 2-(2-methoxyphenyl)trifluoromethanesulfonanilide | 65–70 |
| 7. | 3-methoxy-4-phenyltrifluoromethanesulfonanilide | 157.5–159 |
| 8. | 3-chloro-4-phenyltrifluoromethanesulfonanilide | 83–84 |
| 9. | 4-chloro-3-phenyltrifluoromethanesulfonanilide | 162–164/0.4 |
| 10. | 4-(2-nitrophenyl)trifluoromethanesulfonanilide | 187–188/0.01 |
| 11. | 3-(2,5-dimethylphenyl)trifluoromethanesulfonanilide | 169/0.3 |
| 12. | 3-(2,6-dichlorophenyl)trifluoromethanesulfonanilide | 170/0.2 |
| 13. | 2-(2-biphenylyl)trifluoromethanesulfonanilide | 100–102 |
| 14. | 4-methoxy-3-phenyltrifluoromethanesulfonanilide | 184/0.07 |
| 15. | 6-chloro-3-phenyltrifluoromethanesulfonanilide | 94–98 |
| 16. | 5-chloro-2-phenyltrifluoromethanesulfonanilide | 88.5–91 |
| 17. | 5-methyl-2-phenyltrifluoromethanesulfonanilide | 83–85 |

EXAMPLE 18

3-Amino-4'-chlorobiphenyl (16.1 g., 74 mmole), triethylamine (8.1 g., 80 mmole) and dichloromethane (200 ml.) are placed in reactor, and the mixture is cooled with an ice-salt bath. Trifluoromethanesulfonic anhydride (22.3 g., 80 mmole) is added dropwise over thirty minutes. The mixture is allowed to warm to room temperature and stirred 30 minutes. Hydrochloric acid (10 percent, 150 ml.) is added and the mixture is stirred for 1 hour. The organic layer is separated and evaporated in vacuo. Excess 10 percent sodium hydroxide is added and the mixture is steam distilled and the residual solution is purified by filtration, treated with decolorizing charcoal and filtered again. The solution is acidified with concentrated hydrochloric acid, the product is extracted with dichloromethane, the dichloromethane extracts are dried over magnesium sulfate The compounds of Examples 19–21 are prepared according to the method described in Example 18 using the appropriate precursors.

| Example Number | | Melting Point (in °C.) |
|---|---|---|
| 19. | triethylammonium 3-(2,4-dichlorophenyl)trifluoromethanesulfonanilide | 85–87 |
| 20. | triethylammonium 3-(2,5-dichlorophenyl)trifluoromethanesulfonanilide | 72.5–75 |
| 21. | triethylammonium 4-methyl-3-phenyltrifluoromethanesulfonanilide | 79–80.5 |

EXAMPLE 22

4-Methoxy-3-phenyltrifluoromethanesulfonanilide (9.1 g., 27.5 mmole) in acetic acid (50 ml.) and hydroiodic acid (35 ml.) is heated overnight at 110° to 115° C. The mixture is diluted with water and extracted with dichloromethane. The dichloromethane solution is decolorized with sodium bisulfite, then the solvent is removed by evaporation in vacuo to an oil which crystallizes with scratching. Repeated recrystallization from a mixture of hexane-trichloroethylene gives 4-hydroxy-3-phenyltrifluoromethanesulfonanilide, m.p. 86°–88.5° C.

| | %C | % H | % N |
|---|---|---|---|
| Anal: Calculated for $C_{13}H_{10}F_3NO_3S$: | 49.2 | 3.2 | 4.4 |
| Found: | 49.3 | 3.2 | 4.4 |

What is claimed is:

1. A compound of the formula

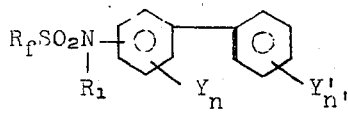

wherein $R_f$ is a lower perfluoroalkyl group, $R_1$ is hydrogen or a pharmaceutically or agriculturally acceptable cation, and Y and Y' are independently selected from the group consisting of lower alkyl, lower alkoxy, hydroxy, nitro, amino, halogen, lower alkanoyloxy, formamido and phenyl and $n$ and $n'$ are independently zero, one, two or three.

2. A compound according to claim 1 wherein $R_f$ is trifluoromethyl.

3. A compound according to claim 1 wherein $R_1$ is hydrogen.

4. A compound according to claim 1 wherein $R_1$ is an amine.

5. A compound according to claim 4 wherein $R_1$ is triethylammonium.

6. A compound according to claim 1 wherein $n$ is zero and Y' is halogen.

7. 4-(4-Chlorophenyl)trifluoromethanesulfonanilide according to claim 6.

8. Triethylammonium 3-(4-chlorophenyl)trifluoromethanesulfonanilide according to claim 6.

9. A compound of the formula

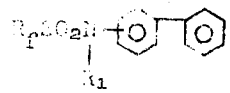

wherein $R_f$ is a lower perfluoroalkyl group and $R_1$ is hydrogen or a pharmaceutically or agriculturally acceptable cation.

10. 4-Phenyltrifluoromethanesulfonanilide according to claim 9.

11. 3-Phenyltrifluoromethanesulfonanilide according to claim 9.

12. 2-Phenyltrifluoromethanesulfonanilide according to claim 9.

* * * * *